United States Patent [19]

Egan et al.

[11] Patent Number: 4,470,865
[45] Date of Patent: Sep. 11, 1984

[54] TIRE TREAD BELT AND METHOD OF MAKING

[75] Inventors: William E. Egan, Tallmadge; Brian M. Logan, Akron, both of Ohio

[73] Assignee: The Goodyear Tire & Rubber Company, Akron, Ohio

[21] Appl. No.: 450,456

[22] Filed: Dec. 16, 1982

[51] Int. Cl.³ .......................................... B29H 17/00
[52] U.S. Cl. ............................... 156/395; 152/209 R; 156/127; 156/212; 156/221; 156/245; 156/247; 156/289; 156/443; 156/500; 249/65; 264/315; 264/336; 428/36; 428/112; 428/114; 428/156
[58] Field of Search ................. 156/96, 110.1, 123, 156/245, 247, 344, 124, 289, 126, 127, 137, 196, 212, 221, 395, 394, 443, 500; 425/35; 249/65; 264/130, 315, 336; 152/209 R; 428/36, 110, 112, 114, 156

[56] References Cited

U.S. PATENT DOCUMENTS

| | | | |
|---|---|---|---|
| 2,713,884 | 7/1955 | Schwartz | 156/96 X |
| 3,143,449 | 8/1964 | Bosomworth et al. | 156/123 X |
| 3,423,503 | 1/1969 | York | 264/130 X |
| 4,088,524 | 5/1978 | Taylor et al. | 156/129 |
| 4,098,936 | 7/1978 | Rawls | 428/40 |
| 4,230,511 | 10/1980 | Olsen | 156/123 |
| 4,308,083 | 12/1981 | Toth, Jr. | 156/129 |

Primary Examiner—William A. Powell
Assistant Examiner—Thomas Bokan
Attorney, Agent, or Firm—Frederick K. Lacher; H. C. Young, Jr.

[57] ABSTRACT

An annular tire tread belt is assembled of uncured resilient material having reinforcing cords. An annular container of resilient material has reinforcing cords extending between annular bead rings at the edges. The container is shaped in a toroidal configuration and the tread belt stuck to the container by a layer of suitable tacky barrier material with sufficient tack to maintain the tread belt in a centered position on the container for engagement with a centered portion of the mold. The barrier material also is sufficiently incompatible with the materials of the container and tread belt to prevent appreciable chemical bonding across the interface during curing of the tread belt. After at least partial curing of the tread belt, the tread belt is detached from the container and is ready for use in a tire.

11 Claims, 6 Drawing Figures

TIRE TREAD BELT AND METHOD OF MAKING

This invention relates generally, as indicated, to a tire tread belt which is at least partially cured before it is used in the manufacture of a tire.

Heretofore tread belts have been cured in molds made for particular size tread belts. The cost of the special molds has been high especially for tread belts needed for development purposes. There have also been problems in providing even distribution of pressure on the tread belts during curing in the molds.

Tread belts have also been built with circumferential grooves and ribs on the radially inner surface and then mounted on a precured tire casing having matching grooves and ribs on the radially outer surface for curing of the tread belt in a conventional tire mold. This process has produced satisfactory tread belts but has necessitated a building drum with grooves and ribs and a mold for the tire casing having ribs and grooves in the molding surface.

In accordance with an aspect of the invention, there is provided a method of making and molding an annular tire tread belt comprising (a) assembling an annular tread belt of uncured resilient material; (b) applying a layer of tacky barrier material to the radially outer surface of an annular container; (c) positively locating said container in a mold of a tire press; (d) positioning said tread belt in a centered location around said container with a radially inner surface of said tread belt releasably stuck by said tacky barrier material to said radially outer surface of said container; (e) closing said press around said tread belt and container; (f) transmitting a curing medium at high temperatures and pressures into said container to press the radially outer surface of said tread belt in a centered position into molding contact with centered portions of said mold for a predetermined time to at least partially cure said tread belt while preventing appreciable chemical bonding across the interface of said tread belt and container; (g) reducing the pressure of said curing medium in said container; (h) opening said press; and (i) removing said tread belt from said container.

In accordance with another aspect of the invention there is provided a tread belt and annular container assembly comprising an annular tread belt of resilient material, a generally toroidal casing of resilient material having spaced edges at the radially inner periphery, said casing being positioned radially inward of said tread belt, a layer of tacky barrier material interposed between and releasably stuck to a radially outer surface of said casing and a radially inner surface of said tread belt, said casing having a pair of substantially inextensible bead rings positioned at said edges and reinforcing cords extending between said bead rings for maintaining said tread belt in an axially centered position on said casing, said tacky barrier material being sufficiently incompatible with the resilient materials of said tread belt and said casing to prevent appreciable chemical bonding across the interface between said tread belt and said casing during vulcanization and said barrier material having sufficient tack to retain said tread belt in said centered position on said casing during expansion and vulcanization and then to permit detachment of said tread belt from said casing after at least partial vulcanization of said tread belt.

Figure 1:
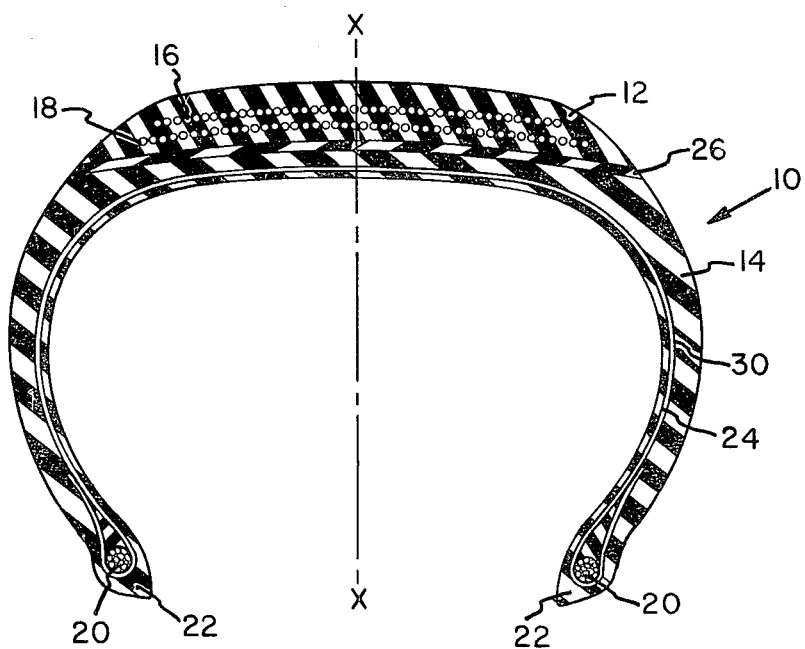
FIG. 1 is a sectional view taken along a radial plane of the tread belt and annular container assembly.

Referring to FIG. 1, a tread belt and annular container assembly 10 embodying the invention is shown with an annular tread belt 12 positioned around an annular container such as generally toroidal casing 14. The tread belt 12 is of a resilient material which may be of an elastomer of the class including natural rubber, SBR and polybutadiene. The tread belt 12 may be reinforced by overlapping plies 16 and 18 of reinforcing cords positioned at opposite bias angles to a plane X—X perpendicular to an axis of the assembly 10. The cords of the plies 16 and 18 may be of high modulus materials such as aramid, nylon or rayon.

The casing 14 may also be of a resilient material and may be of an elastomer of the class including natural rubber, SBR and polybutadiene. The casing 14 has means such as a pair of bead rings 20 at the radially inner edges 22 of the casing for positively locating the casing in a tire press. The bead rings 20 are substantially inextensible and may be of steel or other high modulus material. Radially extending reinforcing cords 24 extend through the body of the casing 14 between the bead rings 20 for limiting the expansion of the casing and centering the tread belt 12.

Interposed between the tread belt 12 and casing 14 is a layer of tacky barrier material 26 covering the interface between the casing and tread belt. Preferably the layer of tacky barrier material 26 has sufficient tack to retain the tread belt 12 in a centered position on the casing 14 during expansion and at least partial vulcanization of the tread belt. The layer of tacky barrier material 26 also is sufficiently incompatible with the materials of the tread belt 12 and casing 14 to prevent appreciable chemical bonding across the interface between the tread belt and casing during vulcanization to permit detachment of the tread belt from the casing after at least partial vulcanization of the tread belt. In the embodiment shown, the tacky barrier material is of butyl rubber with a curing agent of chlorine-activated reactive phenolformaldehyde resin and the tread belt 12 and casing 14 are of materials other than butyl rubber. Accordingly the tread belt and casing assembly 10, shown in FIG. 1, is in condition for detachment of the tread belt 12 from the casing 14.

Figure 2:
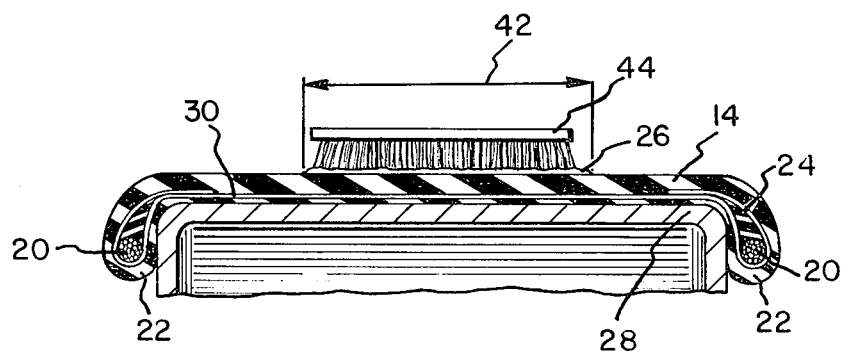
FIG. 2 is a fragmentary sectional view of the container as assembled on a tire building drum and during application of the layer of tacky barrier material.
Figure 3:
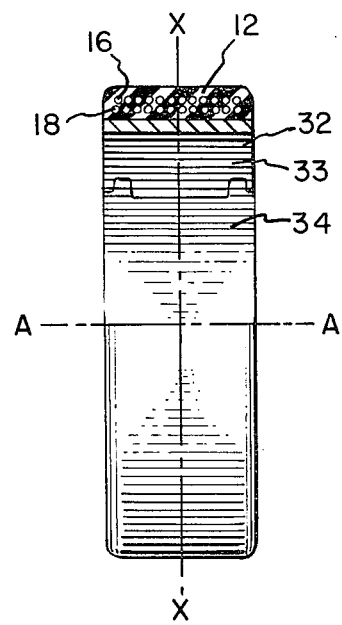
FIG. 3 is a half-sectional view of the collapsible cylindrical member on which the tread belt is assembled with the tread belt in the assembled condition.

Referring to FIGS. 2 through 6, a method of making and molding the annular tread belt 12 is illustrated. As shown in FIG. 2, the casing 14 is assembled around a collapsible cylindrical tire building drum 28. The casing 14 is built or assembled with at least one ply 30 of reinforcing cords 24 extending between the annular bead rings 20 at the edges 22 of the casing. The layer of tacky barrier material 26 may then be applied to a centered space 42 of the casing 14 as by a brush 44 or other suitable means.

Figure 4:
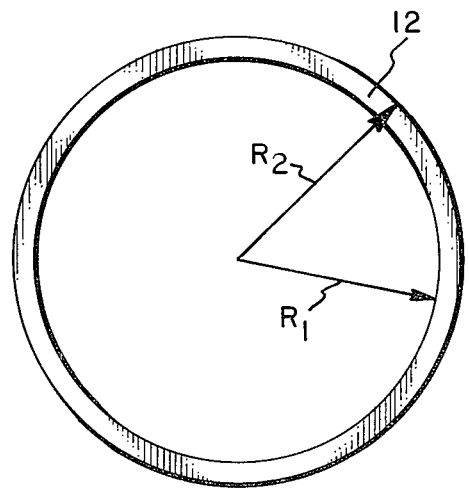
FIG. 4 is a side view of the tread belt after assembly.
Figure 5:
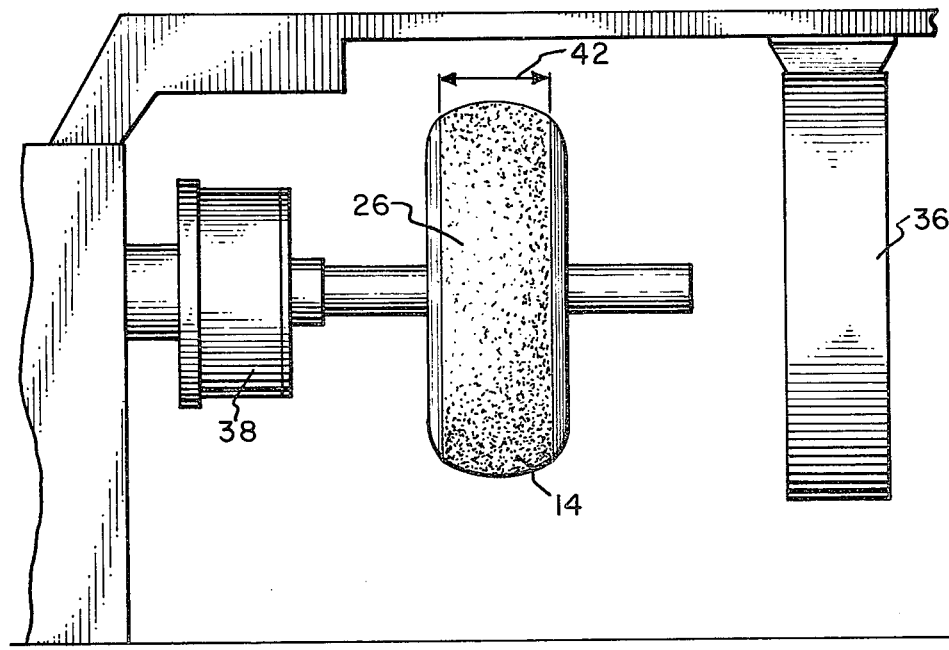
FIG. 5 is a fragmentary schematic view of tire building apparatus supporting the annular container after shaping with the tread belt being carried by transfer means prior to placement around the container.

The tread belt 12 is assembled on a collapsible cylindrical member 32 having segments 34 connected by hinges so that after the tread belt is assembled on the cylindrical member the segments may be folded inwardly as by removing hinge pins from one of the hinges. The tread belt 12 is assembled with the cords of overlapping plies 16 and 18 positioned at desired angles relative to plane X—X which is perpendicular to an axis A—A of the tread belt. After removal of the tread belt 12 from the collapsible cylindrical member 32, it has a cylindrical shape, as shown in FIG. 4, with an inner radius R1 and an outer radius R2. As shown in FIG. 5, the tread belt 12 is placed in a transfer ring 36 of a type well known in the art for gripping the radially outer surface having the outer radius R2.

The casing 14 is removed from the drum 28 and placed on a shaping drum of tire building apparatus 38, shown in FIG. 5. The casing 14 is expanded from the cylindrical shape shown in FIG. 2 to a toroidal shape as shown in FIG. 5 and the transfer ring 36 is moved axially over the casing 14 and the tread belt 12 set in the centered space 42. The casing 14 may be inflated to press the radially outer surface of the casing against the radially inner surface of the tread belt 12.

Figure 6:
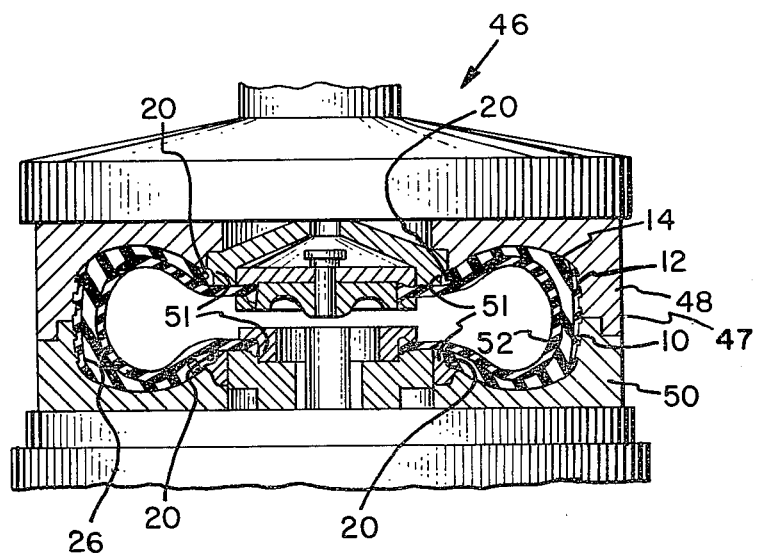
FIG. 6 is a schematic partial sectional view of the annular container and tread belt in a tire vulcanizer having a two-piece mold.

With the tread belt 12 stuck to the casing 14 in a centered position, the casing and tread belt are removed from the tire building apparatus 38 and cured in a conventional tire press 46 having a mold 47 with an upper mold section 48 and a lower mold section 50 split at the plane X—X of the tire casing and tread belt as shown in FIG. 6. The tire casing 14 is positively located in the tire press 46 by the bead rings 20 which are seated in bead rings 51 of the mold sections 48 and 50. Accordingly the tread belt 12, which is centered on the casing 14, will engage a centered portion of the mold sections 48 and 50 of the mold 47. A curing medium such as steam or hot water may be contained in the casing 14 or in a curing bladder 52 within the casing and the mold sections 48 and 50 heated for a sufficient time to at least partially vulcanize the tread belt 12. The casing 14 may also be vulcanized.

The tire press 46 is then opened and the bladder 52 removed from the casing 14. The tread belt and casing assembly 10 may then be removed from the upper mold section 48 and lower mold section 50. During vulcanization, the butyl rubber of the layer of tacky barrier material 26 is sufficently incompatible with the materials of the tread belt 12 and casing 14 to prevent chemical bonding across the interface between the tread belt and casing and therefore after vulcanization the tread belt can be removed from the casing without damage to the radially inner surface. When the tire press 46 is opened the tread belt 12 may remain in one of the mold sections 48 or 50 when tire casing 14 is removed from the press. In that event, the tread belt 12 may be easily removed from the mold section and is ready for use in making a tire. If the tread belt 12 stays on the casing 14 during removal from the tire press 46, it may then be removed from the casing either manually or by spreading the edges 22 of the casing 14 and pulling the tread belt away from the casing.

The casing 14 after vulcanization may be used to vulcanize another tread belt 12 by mounting it on the tire building apparatus 38, as shown in FIG. 5, applying the layer of tacky barrier material 26 to the centered space 42 of the casing by a brush 44 or other suitable means, and then manipulating the cured casing in the same manner as the uncured casing shown and described in FIGS. 5 and 6.

While a certain representative embodiment and details have been shown for the purpose of illustrating the invention, it will be apparent to those skilled in the art that various other changes and modifications may be made therein without departing from the spirit or scope of the invention.

What is claimed is:

1. A method of making and molding an annular tire tread belt comprising
    (a) assembling an annular tread belt of uncured resilient material;
    (b) applying a layer of tacky barrier material to the radially outer surface of an annular container;
    (c) positively locating said container in a mold of a tire press;
    (d) positioning said tread belt in a centered location around said container with a radially inner surface of said tread belt releasably stuck by said tacky barrier material to said radially outer surface of said container;
    (e) closing said press around said tread belt and container;
    (f) transmitting a curing medium at high temperatures and pressures into said container to press the radially outer surface of said tread belt in a centered position into molding contact with centered portions of said mold for a predetermined time to at least partially cure said tread belt while preventing appreciable chemical bonding across the interface of said tread belt and container;
    (g) reducing the pressure of said curing medium in said container;
    (h) opening said press; and
    (i) removing said tread belt from said container.

2. The method of claim 1 wherein said annular container is of reinforced resilient material with inextensible bead rings at the radially inner portion for positively locating said container, and said bead rings being connected by reinforcing cords.

3. The method of claim 1 wherein said annular container is assembled by building a casing in generally cylindrical form of reinforced uncured resilient material having inextensible bead rings at the edges connected by reinforcing cords and then shaping said casing into toroidal form.

4. The method of claim 1 wherein said annular container is removed from said tread belt upon opening of said press and then said tread belt is removed from said press.

5. The method of claim 1 wherein a curing bladder is inserted into said annular container and said curing medium is contained in said bladder.

6. The method of claim 1 wherein said mold is of two sections split at a plane perpendicular to an axis of said tread belt.

7. A tread belt and annular container assembly comprising an annular tread belt of resilient material, a generally toroidal casing of resilient material having spaced edges at the radially inner periphery, said casing being positioned radially inward of said tread belt, a layer of tacky barrier material interposed between and releasably stuck to a radially outer surface of said casing and a radially inner surface of said tread belt, said casing having a pair of substantially inextensible bead rings positioned at said edges and reinforcing cords extending between said bead rings for maintaining said tread belt in an axially centered position on said casing, said tacky barrier material being sufficiently incompatible with the resilient materials of said tread belt and said casing to prevent appreciable chemical bonding across the interface between said tread belt and said casing during vulcanization and said barrier material having sufficient tack to retain said tread belt in said centered position on said casing during expansion and vulcanization and then to permit detachment of said tread belt from said casing after at least partial vulcanization of said tread belt.

8. The assembly of claim 7 wherein said tread belt and said casing are of an elastomer of the class including natural rubber, SBR and polybutadiene excluding butyl and said tacky barrier material is butyl rubber.

9. The assembly of claim 7 wherein said tread belt is reinforced by at least two overlapping plies of reinforcing cords positioned at opposite bias angles to a plane perpendicular to the axis of said assembly.

10. The assembly of claim 7 wherein said casing is reinforced by at least one ply of reinforcing cords extending in a direction generally radial to the axis of said assembly.

11. The assembly of claim 8 wherein the curing agent for said butyl rubber is chlorine-activated reactive phenolformaldehyde resin.

* * * * *